US007831254B2

(12) United States Patent
Natsume

(10) Patent No.: US 7,831,254 B2
(45) Date of Patent: Nov. 9, 2010

(54) TERMINAL DEVICE, AND IN-ZONE CELL CHECKING METHOD AND CELL RE-SELECTION METHOD THEREOF

(75) Inventor: Kohei Natsume, Tokyo (JP)

(73) Assignee: NEC Corporation, Tokyo (JP)

( * ) Notice: Subject to any disclaimer, the term of this patent is extended or adjusted under 35 U.S.C. 154(b) by 1114 days.

(21) Appl. No.: 11/092,681

(22) Filed: Mar. 30, 2005

(65) Prior Publication Data

US 2005/0221830 A1 Oct. 6, 2005

(30) Foreign Application Priority Data

Mar. 31, 2004 (JP) ............................ 2004-104629

(51) Int. Cl.
*H04W 40/00* (2009.01)

(52) U.S. Cl. .................... 455/446; 455/422.1; 455/448; 455/449; 455/343.1; 455/574

(58) Field of Classification Search ............. 455/343.1, 455/343.2, 343.3, 343.4, 343.5, 574, 422.1, 455/446, 449, 448
See application file for complete search history.

(56) References Cited

U.S. PATENT DOCUMENTS

| | | | | |
|---|---|---|---|---|
| 5,539,748 | A * | 7/1996 | Raith | 370/329 |
| 5,574,996 | A * | 11/1996 | Raith | 455/161.3 |
| 5,790,589 | A * | 8/1998 | Hutchison et al. | 375/149 |
| 5,883,885 | A * | 3/1999 | Raith | 370/311 |
| 6,331,971 | B1 * | 12/2001 | Raith | 370/311 |
| 6,535,752 | B1 * | 3/2003 | Dent | 455/574 |
| 6,606,490 | B1 * | 8/2003 | Rainish et al. | 455/343.1 |
| 6,799,030 | B2 * | 9/2004 | Barber et al. | 455/343.1 |
| 7,092,716 | B2 * | 8/2006 | Nizri et al. | 455/448 |
| 7,110,765 | B2 * | 9/2006 | Amerga et al. | 455/436 |
| 7,133,702 | B2 * | 11/2006 | Amerga et al. | 455/574 |
| 7,596,378 | B1 * | 9/2009 | Nizri et al. | 455/448 |
| 2002/0025811 | A1 * | 2/2002 | Willey | 455/434 |
| 2002/0147024 | A1 | 10/2002 | Wan | |
| 2004/0116110 | A1 * | 6/2004 | Amerga et al. | 455/422.1 |
| 2004/0224659 | A1 * | 11/2004 | Cheng | 455/404.1 |

FOREIGN PATENT DOCUMENTS

| | | | |
|---|---|---|---|
| EP | 0 812 119 | A2 | 12/1997 |
| EP | 1 152 624 | A1 | 11/2001 |
| GB | 2 358 550 | A | 7/2001 |
| JP | 2001-169339 | A | 6/2001 |
| JP | 2002-186009 | A | 6/2002 |
| JP | 2003-348001 | A | 12/2003 |
| JP | 2004-32338 | A | 1/2004 |
| WO | WO 2004/021732 | A2 | 3/2004 |

* cited by examiner

*Primary Examiner*—Matthew D Anderson
*Assistant Examiner*—April G Gonzales
(74) *Attorney, Agent, or Firm*—Sughrue Mion, PLLC

(57) ABSTRACT

A terminal device including a radio unit that adopts code division multiple access (cdma), which device omits unnecessary cell search by extending an in-zone cell monitoring cycle and a re-selection cycle in a case where under fixed conditions during cell search, when a physical layer and an RRC of the radio unit determine that a mobile phone remains still.

5 Claims, 7 Drawing Sheets

1
15 DISPLAY UNIT
16 OPERATION UNIT
13 CONTROL UNIT
12 RADIO UNIT
11
18 MICROPHONE
17 SPEAKER
14 MEMORY UNIT

21
RRC
25
CONTROL
BMC
27
24
RLC GROUP
23
MAC LAYER
22
PHYSICAL LAYER
11
ANTENNA
CONTROL
26
PDCP
CONTROL
CONTROL/OBSERVATION

TERMINAL DEVICE, AND IN-ZONE CELL CHECKING METHOD AND CELL RE-SELECTION METHOD THEREOF

BACKGROUNDS OF THE INVENTION

1. Field of the Invention

The present invention relates to a method of efficiently executing cell search of W-CDMA (Wideband CDMA) to reduce power consumption.

2. Description of the Related Art

W-CDMA related to the third generation mobile phones is a successor to the second generation mobile phones which mainly adopts TDMA (Time Division Multiple Access) such as PDC and GSM. It is characterized in that on a transmission side, a narrow band signal is spread into a wideband by a spread code assigned to each base station and transmitted, and is inversely spread on a reception side to reduce effects of noise, as well as enabling transmission of a large volume of data.

W-CDMA receiver has a plurality of RAKE receivers in order to prevent multi-path fading which is a phenomenon that radio waves having passed through different transmission paths arrive at an obstruction or the like with a time difference out of synchronization. Then, a signal obtained by each RAKE receiver is subjected to correction of a delay time and thereafter to RAKE composition. This arrangement has an advantage that a factor of signal deterioration caused by multi-path fading, which is conventionally a main factor of noise, can be handled as stronger radio waves by synchronizing the respective paths.

Another advantage is that having a plurality of RAKE receivers enables soft handover of receiving the same radio waves from two or more base stations, while considering them as one signal by RAKE composition. This prevents an outage phenomenon caused by frequent switching between cells at the time of handover during a call by the second generation mobile phones.

Then, in order to execute the soft handover, a mobile station (=mobile phone) needs to obtain a spread code of not only a cell of a base station (a cell whose path loss is the smallest) in which the phone itself locates but also a cell of its adjacent base station (a cell whose path loss is the second smallest). At the time of searching an adjacent base station, W-CDMA requires processing of detecting a cell having a spread code of a common pilot channel (=CPICH), which processing is called cell search. Then, when a spread code of the adjacent base station (cell whose path loss is the second smallest) is detected to establish synchronization of down spread codes, the mobile station transmits a RACH (Random Access Channel) downwards at predetermined timing, resulting in establishing synchronization of spread codes at a high speed.

(Literature: "W-CDMA Mobile Communication System", pp. 35 (ISBN4-621-04894-5))

As described in the foregoing, while W-CDMA overcomes various shortcoming of the second generation mobile phones, it involves another drawback, which is an increase in power consumption. This is because further processing which is not required in the second generation mobile phones is added to W-CDMA as described above to largely degrade facility of actual users.

First possible solution to such an increase in power consumption is omitting the above-described processing as much as possible. Out of the above-described processing, there exists cell search as the processing required even when not in communication and there have been various methods of omitting the processing.

For example, recited in Japanese Patent Laying-Open No. 6-13959 (hereinafter referred to as Literature 1) is a method of omitting detection of a frequency of an adjacent base station in using a second generation mobile phone. More specifically, the method is first measuring electric field strength of a cell in which the mobile phone itself locates and when the electric field strength is high enough, omitting measurement itself of a change of the electric field strength and electric field strength of a frequency band emitted by the adjacent base station, while when the electric field strength is low, detecting a change of the electric field strength to detect a moving state.

Literature 1, however, is a method invented on the premise that adjacent base stations use different frequencies which is a condition peculiar to the second generation mobile phones, so that the method has difficulty in application, without modification, to W-CDMA in which adjacent base stations use the same frequency.

SUMMARY OF THE INVENTION

An object of the present invention is to provide a method of preventing a waste of power consumption by suppressing useless monitoring (measurement of electric field level of a cell) and cell re-selection (switching of a cell) in a static state and by a simple method of determining whether a terminal is in a static or moving state.

According to the first aspect of the invention, in a terminal device including a radio unit which adopts code division multiple access (cdma), the radio unit including a measurement unit, and the measurement unit measures an active cell for a predetermined period of time in each predetermined monitoring cycle and when the active cell remains unchanged for the predetermined period of time, extends the predetermined monitoring cycle.

In the preferred construction, the terminal device is a mobile phone. Also, the terminal device is a digital camera.

According to the second aspect of the invention, in a terminal device including a radio unit which adopts code division multiple access (cdma), the radio unit including a measurement unit, and the measurement unit measures an active cell a predetermined number of times in each predetermined monitoring cycle and when the in-zone cell remains unchanged the predetermined number of times, extends the predetermined monitoring cycle.

According to the third aspect of the invention, in a terminal device including a radio unit which adopts code division multiple access (cdma), the radio unit including an RRC (Radio Resource Controller), and the RRC starts cell re-selection in each predetermined cell re-selection cycle and when an in-zone cell remains unchanged before and after the cell re-selection, extends the cell re-selection cycle.

In the preferred construction, the radio unit further including a measurement unit, wherein the RRC outputs an in-zone cell monitoring start instruction to the measurement unit at the start of the cell re-selection and collates a reported in-zone cell received from the measurement unit and an in-zone cell obtained at the time of output of the monitoring start instruction to determine whether the cell re-selection cycle is to be extended, and the measurement unit records a cell which becomes an in-zone cell for a desired period of time in response to the monitoring start instruction and counts the number of times when the cell becomes an in-zone cell to specify the reported in-zone cell based on the count result and send the obtained result to the RRC.

In another preferred construction, the radio unit further including a measurement unit, wherein the RRC outputs an in-zone cell monitoring start instruction to the measurement unit at the start of the cell re-selection and collates a reported in-zone cell received from the measurement unit and an in-zone cell obtained at the time of output of the monitoring start instruction to determine whether the cell re-selection cycle is to be extended, the measurement unit records a cell which becomes an in-zone cell for a desired period of time in response to the monitoring start instruction and counts the number of times when the cell becomes an in-zone cell to specify the reported in-zone cell based on the count result and send the obtained result to the RRC, and the measurement unit reports, to the RRC, a cell counted as an in-zone cell a desired number of times or more as the reported in-zone cell.

In another preferred construction, when there exists no cell which is counted as an in-zone cell a desired number of times or more, the measurement unit reports a cell monitored last in the desired period of time as the reported in-zone cell to the RRC.

In another preferred construction, when there exists no cell which is counted as an in-zone cell a desired number of times or more, the measurement unit reports a cell counted most in the desired period of time as the reported in-zone cell to the RRC.

According to the fourth aspect of the invention, an in-zone cell checking method of a terminal device including a radio unit which adopts code division multiple access (cdma), comprises the steps of measuring an active cell for a predetermined period of time in each desired monitoring cycle, and when the in-zone cell remains unchanged for the predetermined period of time, extending the monitoring cycle.

According to the fifth aspect of the invention, an in-zone cell checking method of a terminal device including a radio unit which adopts code division multiple access (cdma), comprises the steps of measuring an active cell a predetermined number of times in each desired monitoring cycle, and when the in-zone cell remains unchanged the predetermined number of times, extending the monitoring cycle.

According to the sixth aspect of the invention, a cell re-selection method of a terminal device including a radio unit which adopts code division multiple access (cdma), comprises the steps of starting cell re-selection in each desired cell re-selection cycle and when an in-zone cell remains unchanged before and after the cell re-selection, extending the cell re-selection cycle.

According to the seventh aspect of the invention, a cell re-selection method of a terminal device including a radio unit which adopts code division multiple access (cdma), comprises the steps of a cell re-selection starting step of starting cell re-selection in each desired cell re-selection cycle, an in-zone cell monitoring step of checking an in-zone cell for a predetermined period of time to record a cell confirmed an in-zone cell and the number of times of confirmation, a reported in-zone cell selecting step of selecting a reported in-zone cell with reference to a result obtained at the in-zone cell monitoring step, and a cell re-selection executing step of collating the reported in-zone cell obtained at the reported in-zone cell selecting step and an in-zone cell as of before cell re-selection start to extend the desired cell re-selection cycle.

In the preferred construction, a cell whose the number of times of confirmation which is recorded at the in-zone cell monitoring step is not less than a predetermined number of times is considered as an in-zone cell, and an in-zone cell as of before cell re-selection start and an in-zone cell confirmed at the in-zone cell monitoring step are collated at the cell re-selection executing step to extend the desired cell re-selection cycle when the collation results in finding that the cells are the same.

In another preferred construction, when there exist a plurality of the cells whose number of times of confirmation is not less than the predetermined number of times, the reported in-zone cell selecting step considers a cell whose the number of times of confirmation is the largest as a reported in-zone cell.

In another preferred construction, when there exist a plurality of the cells whose number of times of confirmation is not less than the predetermined number of times, the reported in-zone cell selecting step considers a cell which is confirmed latest among the plurality of cells as a reported in-zone cell.

In another preferred construction, a cell whose the number of times of confirmation which is recorded at the in-zone cell monitoring step is not less than a predetermined number of times is considered as an in-zone cell, and an in-zone cell as of before cell re-selection start and an in-zone cell confirmed at the in-zone cell monitoring step are collated at the cell re-selection executing step to extend the desired cell re-selection cycle when the collation results in finding a plurality of times in succession that the cells are the same.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, although the device is simply referred to as a mobile phone, it is not necessarily limited to W-CDMA. It may be other systems using CDMA (Code Division Multiple Access), that is, IS-95 or cdma 2000.

First Embodiment

Figure 1:
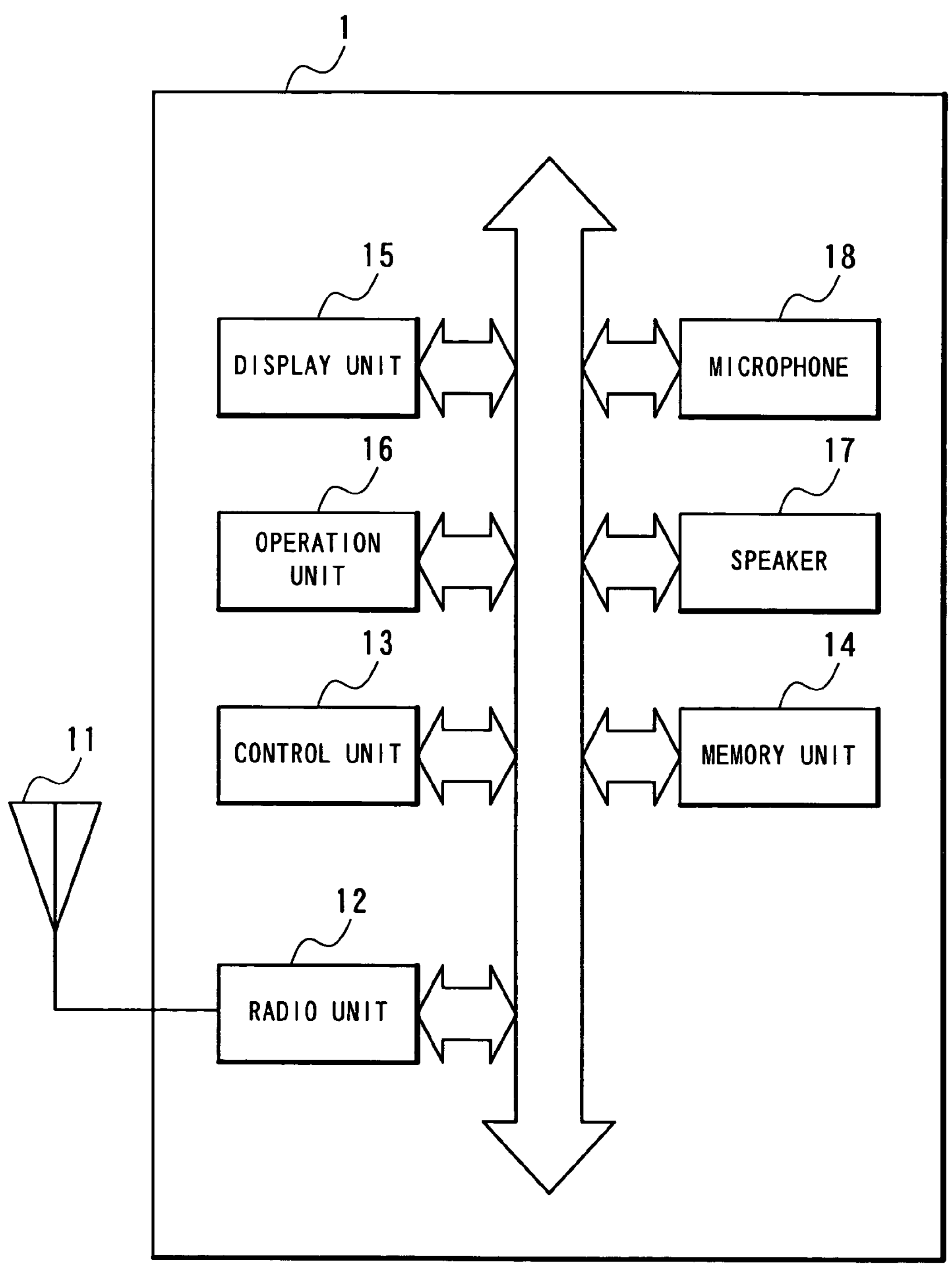
FIG. 1 is a block diagram showing a structure of a mobile phone according to the present invention.
Figure 2:
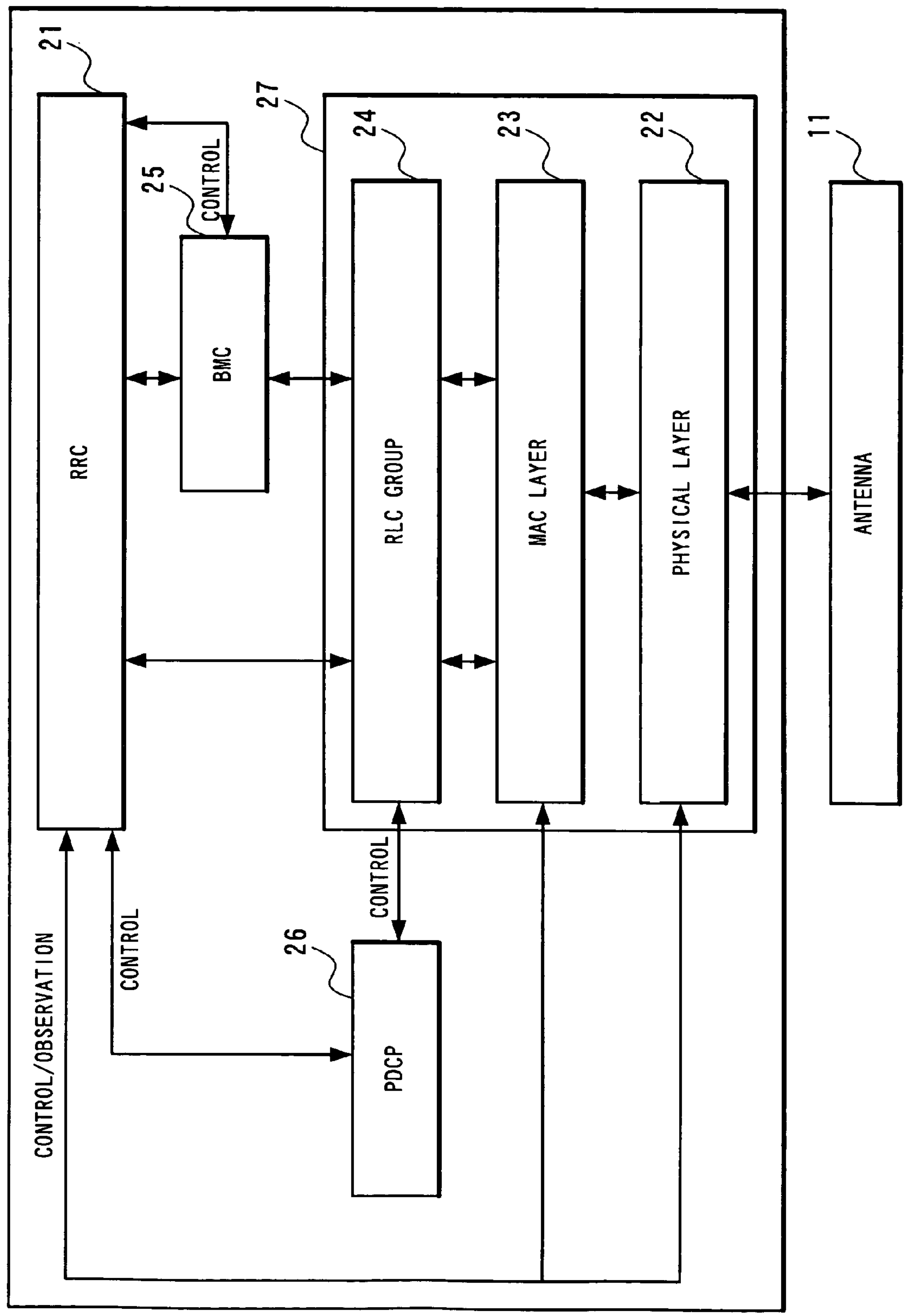
FIG. 2 is a block diagram showing a structure of a radio unit 12 of the mobile phone according to the present invention.

FIG. 1 is a block diagram of a mobile phone 1 according to a first embodiment of the present invention and FIG. 2 shows protocol architecture of a W-CDMA mobile phone.

The mobile phone 1 includes an antenna 11, a radio unit 12, a control unit 13, a memory unit 14, a display unit 15, an operation unit 16, a speaker 17 and a microphone 18.

The antenna 11 is a medium for use in transmission and reception, and receiving an analog signal of its resonance frequency enables acquisition of information sent from a base station. Accordingly, a logically best antenna has a length half a wave length to be used (λ/2).

The radio unit 12 serves to demodulate and digitize an analog signal received by the antenna 11 to make the signal be handled by the control unit 14 or the like. In addition, the radio unit 12 outputs an analog signal subjected to transmission line coding to a base station not shown through the antenna 11. Although it is a common practice for recent mobile phones to use two CPUs, one for application operation and the other for radio communication, the radio unit 12 includes a CPU for radio communication in the present invention.

The control unit 13 is in charge of entire control of the mobile phone 1. The unit in general represents a CPU (Central Processing Unit) and its peripherals and in recent years, it is a common practice to use two CPUs, one for radio communication and the other for application. The present invention is premised on that the control unit 13 is a CPU for application operation or the like.

The memory unit 14 represents, in addition to a RAM (Random Access Memory) for use as a temporary region when the control unit 13 or the like operates and a ROM (Read Only Memory) in which a basic program or the like is written, a nonvolatile memory where information which should be held even at power-off is stored. As to the unit as well, no device for practical use is designated in particular in the present invention.

The display unit 15 is formed of a liquid crystal display, a display driver or the like which displays such a passive event as status of the mobile phone 1 including an incoming call and a calling, and mail reception and such an active event as a call originating party number and mail editor in editing operation. The liquid crystal display may be replaced by an organic EL display or the like.

The operation unit 16 is formed of ten keys, a pointing device or the like for use by an operator of the mobile phone 1 to enter a telephone number, edit a mail or the like. Depending on a purpose of use, a jog dial or the like may be used whose structure is a matter of designing.

Although the speaker 17 and the microphone 18 are devices mainly for use in telephone conversation, their usage is not limited thereto.

FIG. 2 is a diagram showing protocol architecture of the antenna unit 11 and the radio unit 12.

An analog signal received by the antenna 11 is sent to a physical layer (PHY) 22 of the reception unit 12. The physical layer 22 serves to demodulate a received analog signal subjected to transmission line coding into a digital signal. Measurement of reception quality is also conducted by the physical layer 22.

An RRC (Radio Resource Control) 21 is one of third layers (network layers). The RRC 21 serves to establish a connection from a mobile phone as a terminal to a base station or the like. RRC also executes control•observation or the like of the physical layer 22 and a MAC layer 23. The present invention mainly relates to operation of the RRC 21. The RRC 21 holds a reported in-zone cell which is reported by the MAC layer 23 and uses the same for subsequent cell re-selection.

The physical layer 22 decodes an analog signal received by the antenna unit 11 into a digital signal. The layer also conducts measurement of quality of received electric field under the control of the RRC 21. In addition, when instructed to start re-selection by the RRC 21, the layer controls start•stop of transmission/reception. The digital signal which is demodulated by the physical layer 22 can not be yet used by the control unit 13 as it is. The reason is that the signal is subjected to transmission line coding for facilitating error detection and error correction. Decoding of the transmission line coding is conducted by the MAC (Media Access Control) layer 23.

The MAC layer 23 conducts mapping of a logical channel and a transport channel and identification of a terminal such as a mobile phone in a transport format combination selection common channel. In the present invention, the layer has a function of observing an active cell (a cell whose path loss is the smallest) during monitoring with reference to BCCH and deriving a cell expected to have the terminal existing (in-zone cell) at present from the result and reporting the in-zone cell to the RRC 21. In-zone cell reported to the RRC 21 will be referred to as a reported in-zone cell.

An RLC group 24 provides a higher layer with such a function as segmentation, reassembly and padding in order to realize transmissive data transfer, unacknowledged data transfer and acknowledged data transfer. In the present invention, the RLC group serves for intervention in transmitting an in-zone cell specified by the MAC layer to the RRC 21.

In the detailed description of the present invention, the quality measurement function and the function of analyzing a measurement result of the physical layer 22, the MAC layer 23 and the RLC group 24 are generically referred to as a measurement unit 27.

A BMC (Broadcast Multicast Control) 25 is an L2 sublayer equivalent to a data link layer in a seven layers model of OSI. BMC is equivalently handled in all the services except broadcast multicast.

Main function of a PDCP (Packet Data Coverage Protocol) 26 is compressing redundant network PDU control information, transferring packet data protocol user data and the like by using service provided by the RLC group 24.

Figure 3:
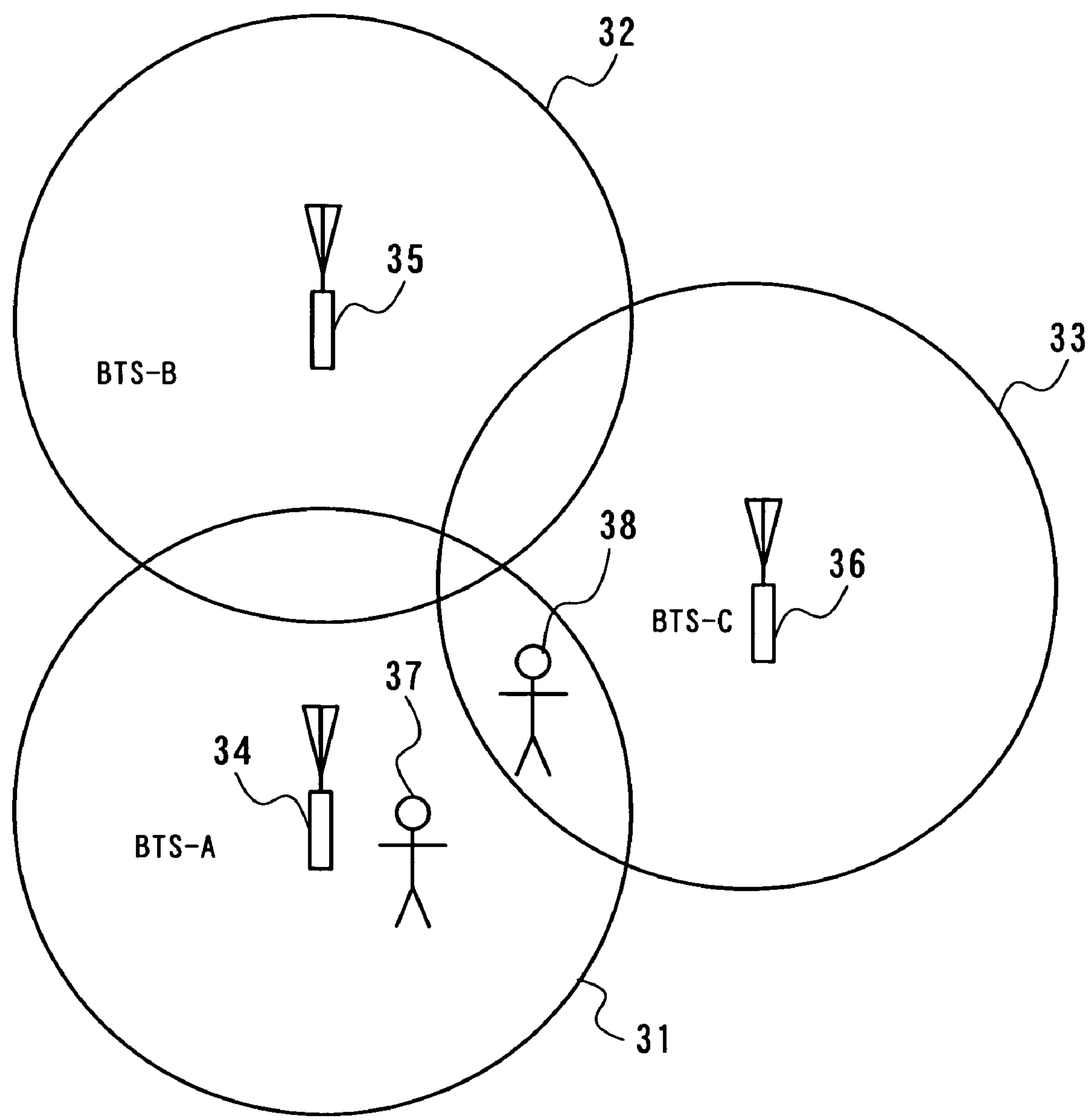
FIG. 3 is a conceptual diagram of cell search by W-CDMA.

FIG. 3 is a diagram showing how the mobile phone having the structure illustrated in FIG. 1 and FIG. 2 according to the present invention operates with a base station in practice.

Cells 31, 32 and 33 are cells having ranges reachable by radio waves which correspond to BTS-A34, BTS-B35 and BTS-C36, respectively. In the figure, a mobile phone 37 currently held by a user is located in the cell 31 of BTS-A34.

The radio unit 12 periodically monitors received electric field quality of not only the cell 31 which can be seen at the present position but also the nearby cells 32 and 33 and reports the monitoring result to the CPU of the radio unit 12. Consider a case where when the radio unit 12 of the user's mobile phone 37 exists in the cell 31 (in-zone cell), the cells 32 and 33 (monitoring cell) are monitored as well. When there appears a cell (the cell 32 or the cell 33) whose level is higher than that of the cell 31 due to a change of electric fields or the like, the physical layer 22 of the radio unit 12 determines that the mobile phone exists in the cell whose path loss is the smallest to report a new in-zone cell to the RRC 21. Thereafter, the RRC 21 collates the reported in-zone cell and the in-zone cell as of before monitoring start and when they differ from each other, the RCC 21 executes switching of an in-zone cell (cell re-selection).

Here, it is hardly expected that when the user's cellar phone 37 keeps still, an electric field level of the BTS-A 34 existing in the cell and electric field levels of the nearby BTS-B 35 and BTS-C 36 will heavily change. It is accordingly expected that the same cell will be constantly monitored.

On the other hand, when the user moves only within the cell 31 of the BTS-A 34 where the user locates or when conditions of surrounding noise change or when the user moves to a middle point (at a point 38 in FIG. 3) between the BTS-A 34 and the BTS-C 36, the BTS-B 35 or the BTS-C 36 might become an active cell during monitoring of an active cell by the MAC layer 23 although an in-zone cell remains the same at the start and at the end of cell re-selection.

Further expected is that although an in-zone cell itself is switched at the start and at the end of cell re-selection, a plurality of cells will be detected as an active cell per unit time.

Summarizing the foregoing has the following classification:

(a) a case where the same cell constantly remains an active cell, (b) a case where although an active cell reported during active cell monitoring by the MAC layer 23 in cell re-selection is not the same each time, the same cell is reported frequently when evaluated per unit time, and (c) a case where an active cell changes with time during monitoring by the MAC layer 23 and the same cell is not reported.

The first embodiment of the present invention aims at suppressing generation of useless cell re-selection in the cases (a) and (b), out of the above classification, where the determination is made that an in-zone cell remains the same or frequency of reporting the same as being an in-zone cell per unit time is high. More specifically, the object is realized by extending a cycle of active cell monitoring by the MAC layer 23 to reduce the number of times of monitoring by the MAC layer 23.

First, operation executed in the case of (a) will be described with reference to FIG. 4.

Immediately after power application, the MAC layer 23 sets Tmon (monitoring cycle) to To (initial value) and a timer value T indicative of a monitoring time to 0 after confirming a cell of the base station where the phone itself resides (cell whose path loss is the smallest) (S400). When a cell re-selection instruction is issued by the RRC 21, the MAC layer 23 starts monitoring an active cell (S401: Yes).

Upon receiving the cell re-selection starting instruction from the RRC 21, after a lapse of Tmon of the counted timer value T (S402), the MAC layer 23 monitors an active cell (S403). When an active cell monitored last time and the active cell monitored this time differ from each other (S403: No), the MAC layer 23 sets Tmon to To (S404). On the other hand, when the active cell monitored last time and the active cell monitored this time are the same (S403: Yes), check whether T exceeds a defined value T1 (S405). When T fails to exceed T1 (S405: No), after a lapse of Tmon (S402), the MAC layer 23 again checks an active cell (S403). On the other hand, when T exceeds T1 (S404: Yes), increment Tmon by a predetermined Tx to return T to 0. Through the operation, an interval of monitoring by the MAC layer 23 is extended to reduce the number of times of monitoring per unit time. This also produces an effect of reducing power consumption of the entire terminal. Although the value of Tmon can be accumulatively increased in FIG. 4, it is also possible to once increase the value of Tmon and fix the same at the increased value.

Operation in a case of (b) will be described in the following. Unlike the case of (a), not a cycle of monitoring by the MAC layer 23 but a cycle of cell re-selection by the RRC 21 sent from the network side is changed in the case of (b).

Cell re-selection is closely related to RRC connection made between an RRC (equivalent to the RRC 21 in FIG. 2) of the terminal and an RRC of the base station.

The cell re-selection is started by instructing controlling the physical layer 22 to stop transmission and reception and execute only reception by the cell re-selection function in the RRC 21. The MAC layer 23 refers to BCCH transmitted from the base station through the physical layer 22 to detect an active cell. The MAC layer 23 specifies a reported in-zone cell with reference to an active cell detected during a monitoring period and the number of detections of each active cell. Reported in-zone cell is a cell which is reported to have the terminal being located at present by the MAC layer 23 to the RRC 21.

Figure 7:
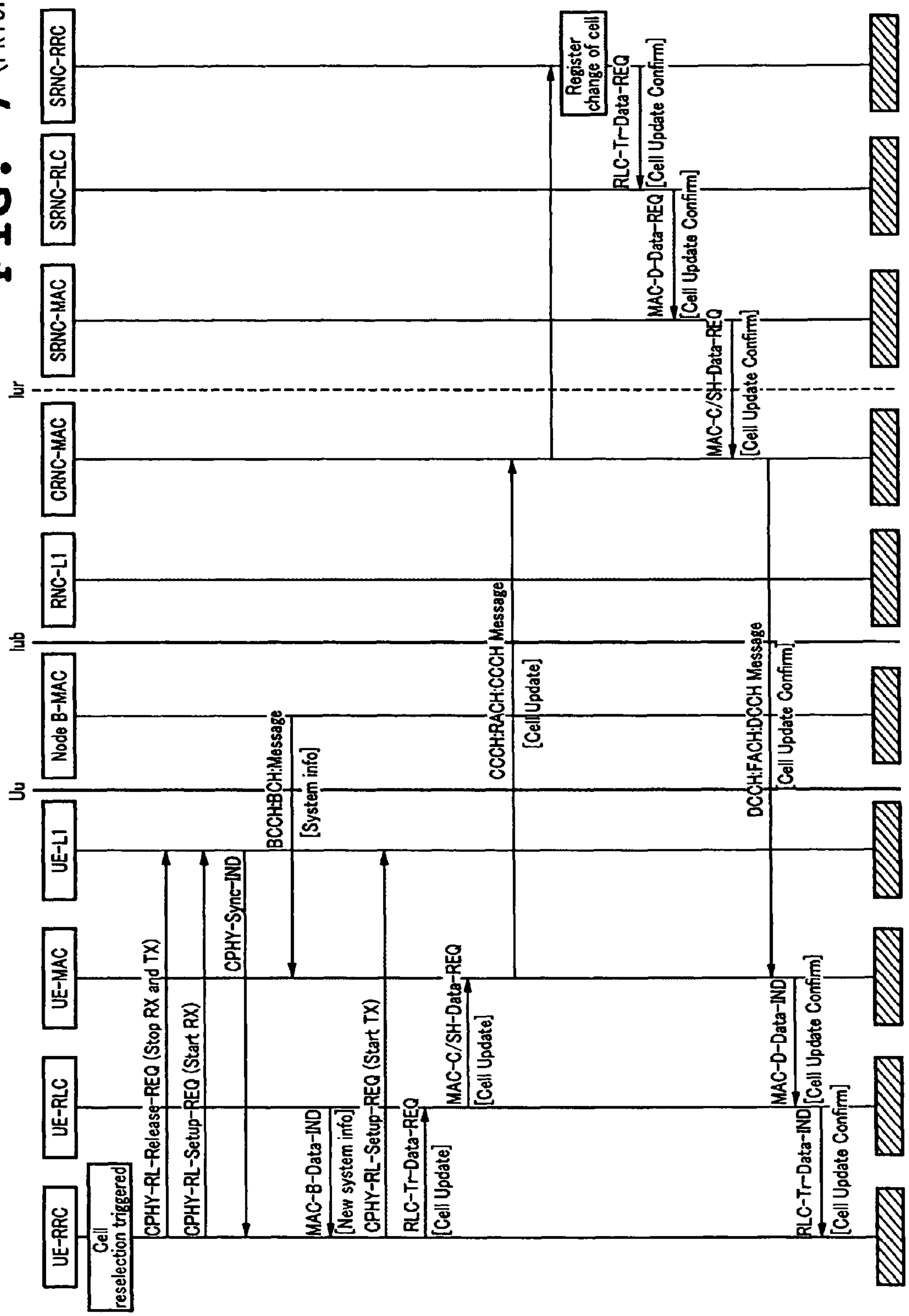
FIG. 7 is a sequence chart showing a conventional cell update processing procedure.

Upon receiving transmission of the reported in-zone cell, the RRC 21 instructs the physical layer 22 to start transmission in order to report the cell to which the terminal at present belongs to the SRNC on the base station side and thereafter sends a result of the cell re-selection as one of parameters of a CCCH message to the SRNC through the base station (cell update). After analyzing the contents of the cell update and registering the base station selected by the terminal at present, the SRNC reports the terminal that the registration is made as one parameter of a DCCH message (cell update confirmation) . While processing of the cell re-selection is started on the terminal side, the re-selection cycle is transmitted from the base station side. This is a common processing procedure of cell re-selection whose outlines are recited in "3GTS25.303V3.3.0" (6.4.2 Cell Update in particular) (hereinafter referred to as Literature 2). FIG. 7 shows a part most related to the above-described processing which is taken out from Literature 2.

This case is characterized in that it is processed by allowing the terminal side to arbitrarily change a cycle of cell re-selection executed by the RRC 21. In the following, description will be made with reference to FIG. 5.

When the power is applied to the terminal, the RRC 21 sets Tresel (cycle of cell re-selection) to Tdef as an initial value (S501). Thereafter, set T as a target of determination whether cell re-selection is conducted or not to 0 (S502). While T is smaller Tresel (S503: No), continue adding T without conducting cell re-selection (S504). When T exceeds Tresel (S503: Yes), the RRC 21 starts cell re-selection. As described above, when the cell re-selection is started, the RRC 21 causes the physical layer 22 to once stop transmission and reception and conduct only the reception. The physical layer 22 demodulates analog data into digital data and reports the digital data to the MAC layer 23. By monitoring the BCCH with reference to the contents of the data transmitted from the physical layer 22, the MAC layer 23 specifies an active cell to count how many times the in-zone cell of the terminal changes during a predetermined monitoring period (T1 in FIG. 4). For example, when the in-zone cell changes as follows:

A→A→B→C→A (sample 1), count the cell A as three times and each of the cell B and the cell C as once. On the other hand, when the in-zone cell changes as follows:

A→A→B→C→C (sample 2), count each of the cell A and the cell C as twice and the cell B as once.

The MAC layer 23 determines a reported in-zone cell based on an active cell detected during the monitoring period and the number of detections of each detected active cell. Here, the method of selecting a reported in-zone cell by the MAC layer 23 varies with a case where a specific cell is generated N times in two seconds of T and a case where it is not. When a specific in-zone cell is counted N times, in a case where N=3 in the sample 1, for example, the MAC layer 23 considers the reported in-zone cell as the relevant cell. How the value of N is set is a matter of designing. In a case of (b), because an active cell changes, the monitoring cycle Tmon is expected to be an initial value, so that the value may be fixed or may be variable.

On the other hand, in a case where the number of times of monitoring of a certain in-zone cell fails to reach a defined value N as shown in the sample 2, the MAC layer 23 considers an arbitrary cell as an in-zone cell. The MAC layer 23 may consider, for example, a cell whose monitoring frequency is the highest (the cell A or the cell C in the sample 2 case) or a latest monitored cell (the cell C in the sample 2 case) as a reported in-zone cell. Which cell is to be considered as a reported in-zone cell is a matter of designing of the MAC layer 23.

Then, after determining the reported in-zone cell, the MAC layer 23 reports the reported in-zone cell to the RRC 21 (S506). The RRC 21 collates the reported in-zone cell which is reported and the in-zone cell as of the monitoring start and when they are the same, determines that the terminal is at the static state (S507: Yes). Then, the RRC 21 extends Tresel by a predetermined Ty (S508).

On the other hand, when the in-zone cell as of monitoring start and the reported in-zone cell differ from each other (S507: No), the RRC 21 determines that the terminal is in a moving state. Upon determining that it is in the moving state, the RRC 21 initializes Tresel to the initial value Tdef (S509).

Then, the RRC 21 replaces the in-zone cell with the cell reported as the reported in-zone cell.

In order to transmit the reported in-zone cell to the SRNC as a result of the re-selection, the RRC 21 issues an instruction to start transmission control to the physical layer 22. Then, the RRC 21 transmits data including Tresel to the SRNC (cell update) and thereafter waits for a cell update confirmation from the SRNC.

Figure 5:
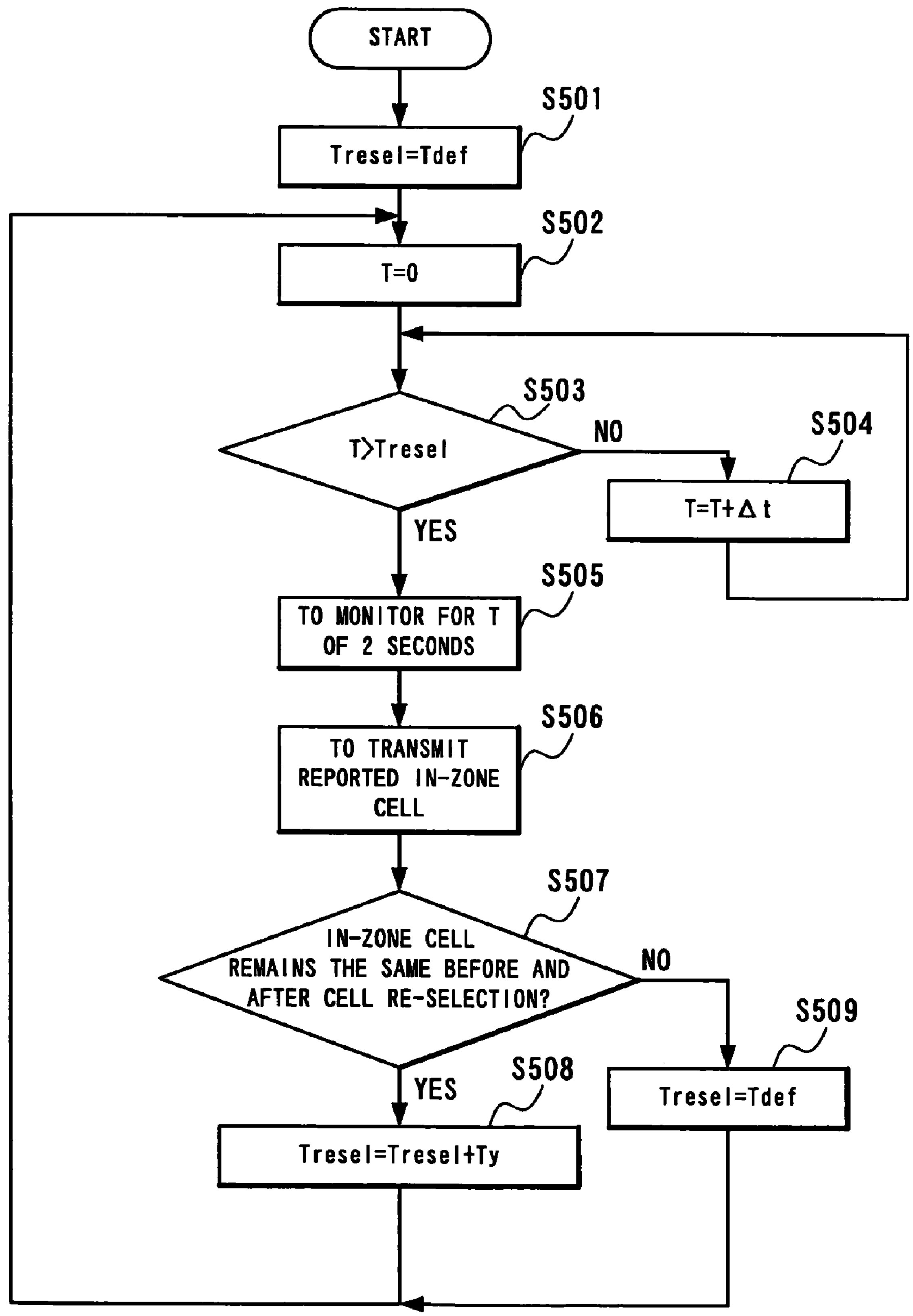
FIG. 5 is a flow chart showing operation of the RRC 21 and the measurement unit 27 of the radio unit 12 executed when determination is made that the mobile phone according to the first embodiment of the present invention stands still at the same point.

FIG. 5 is premised on that the value of Tresel is accumulatively incremented. Similarly to the case of (a), however, when the value of Tresel is once incremented, Tresel may be fixed unless when it is returned to the initial value.

As described in the foregoing, varying a cell re-selection cycle enables operation taking power efficiency and suppression of unnecessary cell re-selection fully into consideration.

Second Embodiment

Figure 4:
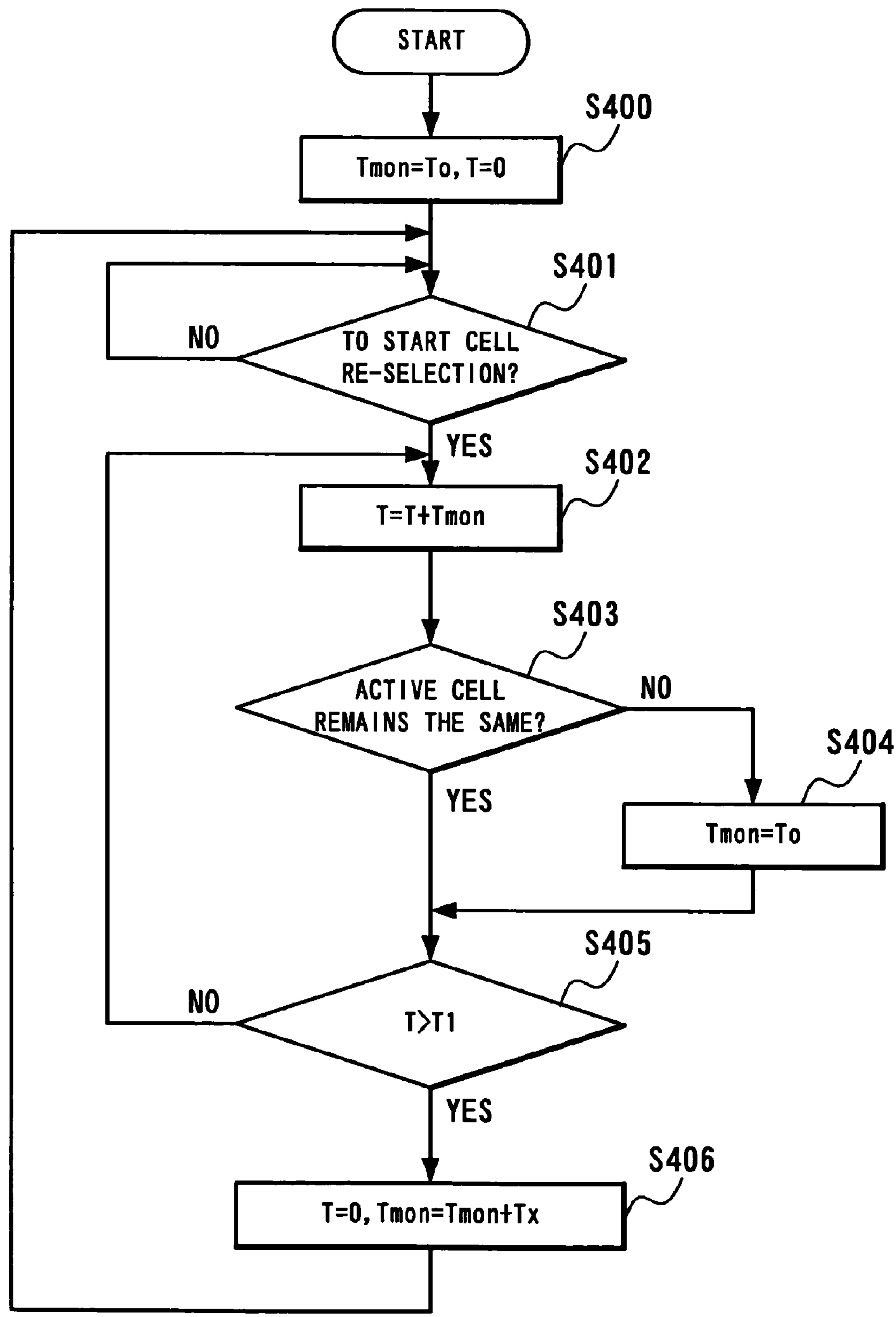
FIG. 4 is a flow chart showing operation of an RRC 21 and a measurement unit 27 of the radio unit 12 executed when determination is made that a mobile phone according to a first embodiment of the present invention stands still at the same point.

In the above-described first embodiment, in making determination in the case (a) where the same cell remains active all the time to cause no cell re-selection, when an in-zone cell remains the same for the period T of one second, the determination is made that it is the same cell (FIG. 4: S402~S404). Alternatively, the value of Tmon may be changed when monitoring occurs in succession as many times as or more than a fixed value. On this occasion, even when monitoring occurs in succession over different cell re-selections, whether the value of Tmon should be changed or not is a matter of designing.

Third Embodiment

Figure 6:
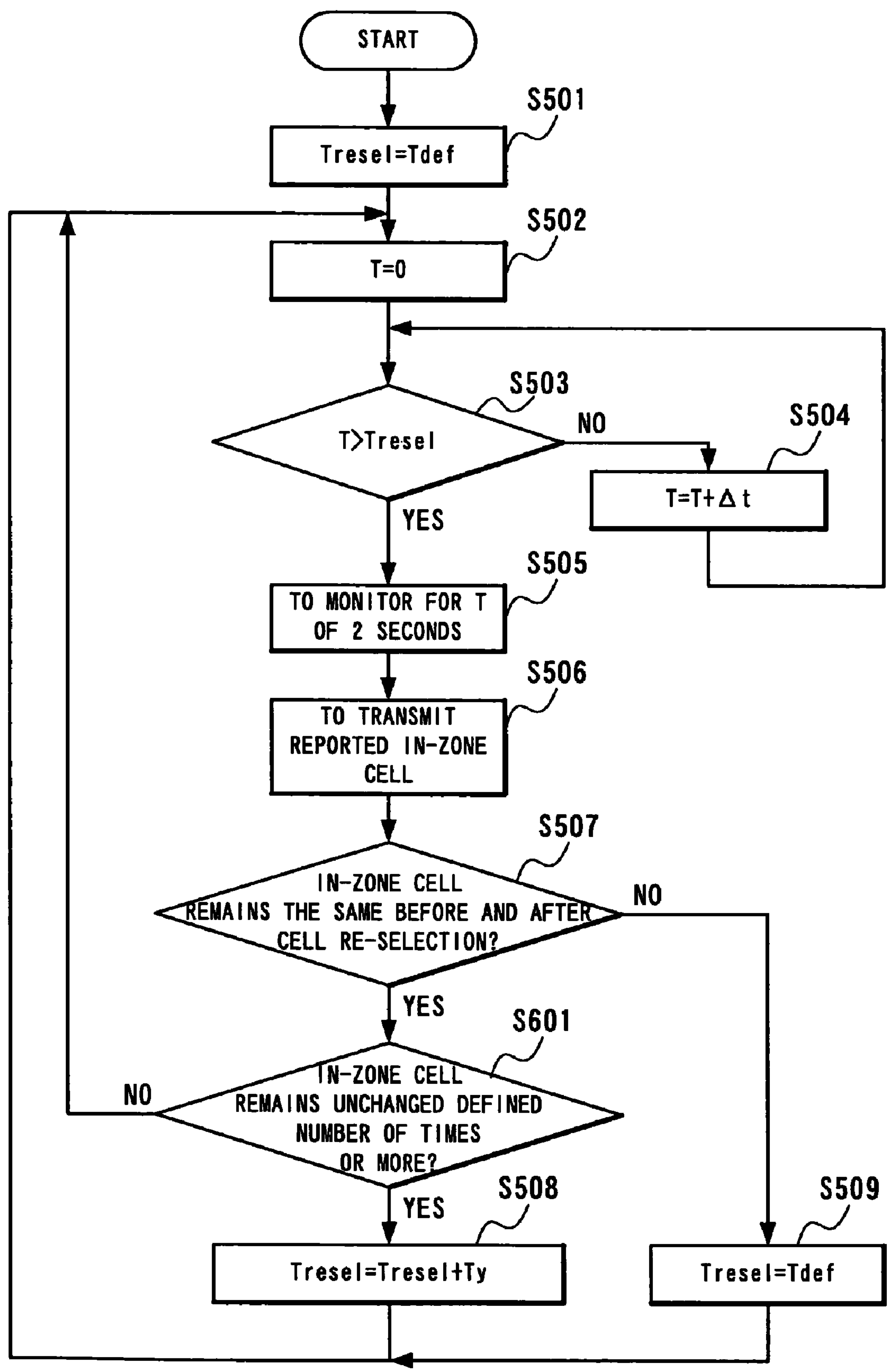
FIG. 6 is a flow chart showing operation of the RRC 21 and the measurement unit 27 of the radio unit 12 executed when determination is made that a mobile phone according to a third embodiment of the present invention stands still at the same point.

While in the above-described first embodiment, when the determination is made that the terminal is in the moving state, the re-selection cycle Tresel is returned to the initial value instantly, it may be returned to the initial value after the terminal enters the moving state certain times in succession. Conversely, the time of Tresel may be extended first time upon entering the moving state (Tresel) certain times in succession. FIG. 6 shows a flow chart of a case where the time of Tresel is extended first time upon entering the moving state (Tresel) certain times in succession. Since this figure is almost common to FIG. 5, parts where the same processing is executed are allotted the same numerals as those in FIG. 5. Therefore, in the following, the description will be made only of a different part.

The MAC layer 23 transmits a reported in-zone cell to the RRC 21 (S506). When the reported in-zone cell is the same as an in-zone cell as of the re-selection start (S507: Yes), the RRC 21 next checks whether the in-zone cell remains unchanged in a defined number of times of re-selection or more (S601). When the defined number of times of re-selection is yet to be reached (S601: No), initialize the value of T in order to again conduct cell re-selection after a lapse of Tresel (S502). On the other hand, when the defined number of times of re-selection is reached (S601: Yes), extend Tresel by the predetermined Ty (S508).

Even when the in-zone cell is not the same before and after cell re-selection, by adopting a step equivalent to S601, the value can be returned to the initial value upon entering the moving state certain times in succession.

According to the present invention, unnecessary active cell monitoring and cell re-selection can be suppressed by extending an active cell monitoring cycle and a cell re-selection cycle. This is expected to realize battery saving of the entire terminal, resulting in extending a reception waiting time.

Another expected effect is reducing loads on a mobile communication network because extending a cell re-selection cycle reduces transmission and reception of cell update and cell update confirmation to/from the SRNC (Serving Radio Network Controller).

Although the above embodiments have been described limitedly with respect to a W-CDMA mobile phone, they are not necessarily limited to the same. Application, for example, to the cdma2000 system is also possible.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A cell re-selection method of a terminal device including a radio unit which adopts code division multiple access (cdma), comprising the steps of:

a cell re-selection starting step of starting cell re-selection in each desired cell re-selection cycle, an in-zone cell monitoring step of checking an in-zone cell for a predetermined period of time to record a cell confirmed an in-zone cell and the number of times of confirmation, a reported in-zone cell selecting step of selecting a reported in-zone cell with reference to a result obtained at said in-zone cell monitoring step, and a cell re-selection executing step of collating said reported in-zone cell obtained at said reported in-zone cell selecting step and an in-zone cell as of before cell re-selection start to extend said desired cell re-selection cycle such that an elapsed time until an in-zone cell is monitored is increased, wherein a cell whose said number of times of confirmation which is recorded at the in-zone cell monitoring step is not less than a predetermined number of times is considered as an in-zone cell, and an in-zone cell as of before cell re-selection start and an in-zone cell confirmed at the in-zone cell monitoring step are collated at said cell re-selection executing to extend said desired cell re-selection cycle when said collation results in finding that the cells are the same.

2. The cell re-selection method of a terminal device as set forth in claim 1, wherein when there exist a plurality of said cells whose number of times of confirmation is not less than the predetermined number of times, said reported in-zone cell selecting step considers a cell which is confirmed latest among said plurality of cells as a reported in-zone cell.

3. The cell re-selection method of a terminal device as set forth in claim 2, wherein when there exist a plurality of said cells whose number of times of confirmation is not less than the predetermined number of times, said reported in-zone cell selecting step considers a cell whose said number of times of confirmation is the largest as a reported in-zone cell.

4. The cell re-selection method of a terminal device as set forth in claim 1, wherein a cell whose said number of times of confirmation which is recorded at the in-zone cell monitoring step is not less than a predetermined number of times is considered as an in-zone cell, and an in-zone cell as of before cell re-selection start and an in-zone cell confirmed at the in-zone cell monitoring step are collated at said cell re-selection executing step to extend said desired cell re-selection cycle when said collation results in finding a plurality of times in succession that the cells are the same.

5. A tangible computer-readable medium having stored therein a program for causing a computer to execute cell re-selection of a terminal device including a radio unit which adopts code division multiple access (cdma), said program including computer executable instructions for performing steps comprising:

starting cell re-selection in each desired cell re-selection cycle, checking an in-zone cell for a predetermined period of time to record a cell confirmed an in-zone cell and the number of times of confirmation, selecting a reported in-zone cell with reference to a result obtained at said in-zone cell monitoring function, and collating said reported in-zone cell obtained by said selecting a reported in-zone cell step and an in-zone cell as of before cell re-selection start to extend said desired cell re-selection cycle such that an elapsed time until an in-zone cell is monitored is increased, wherein a cell whose said number of times of confirmation which is recorded at the checking step is not less than a predetermined number of times is considered as an in-zone cell, and an in-zone cell as of before cell re-selection start and an in-zone cell confirmed at the checking step are collated at said cell re-selection executing step to extend said desired cell re-selection cycle when said collation results in finding that the cells are the same.

* * * * *